No. 813,069. PATENTED FEB. 20, 1906.
F. V. WRIGHT.
LEVEE.
APPLICATION FILED SEPT. 12, 1905.
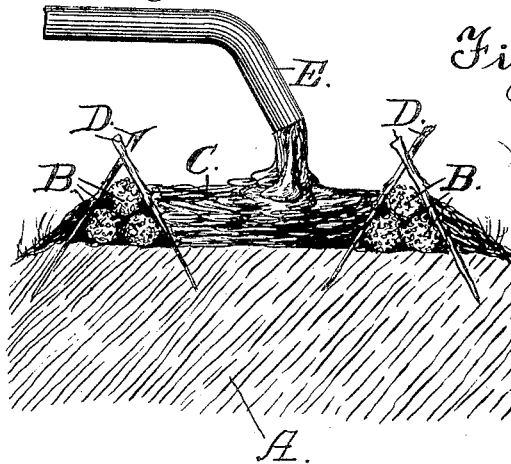
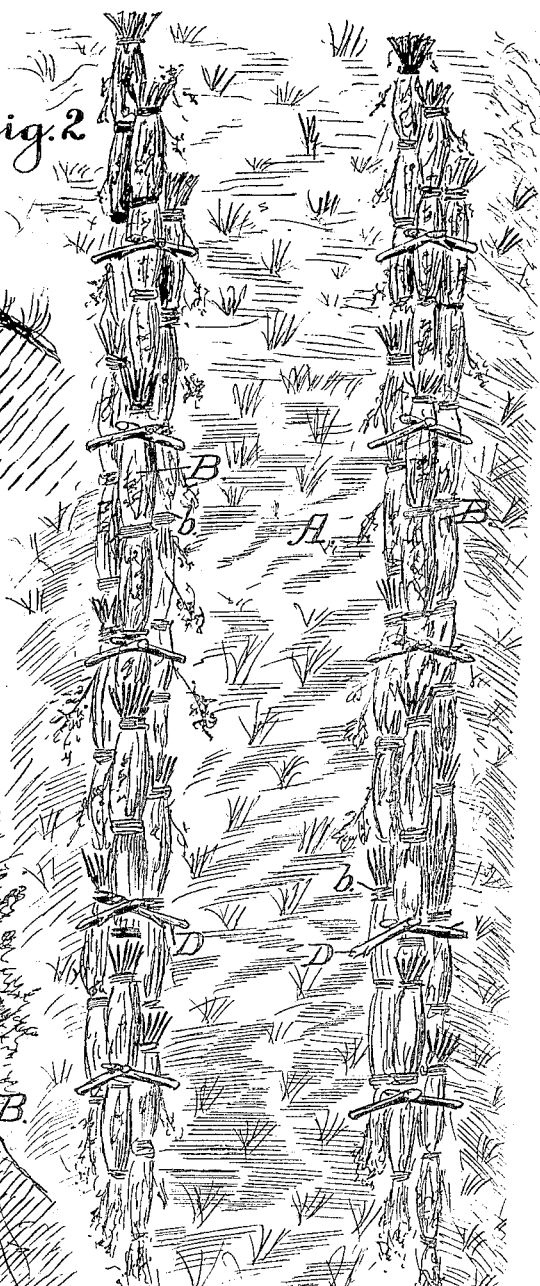
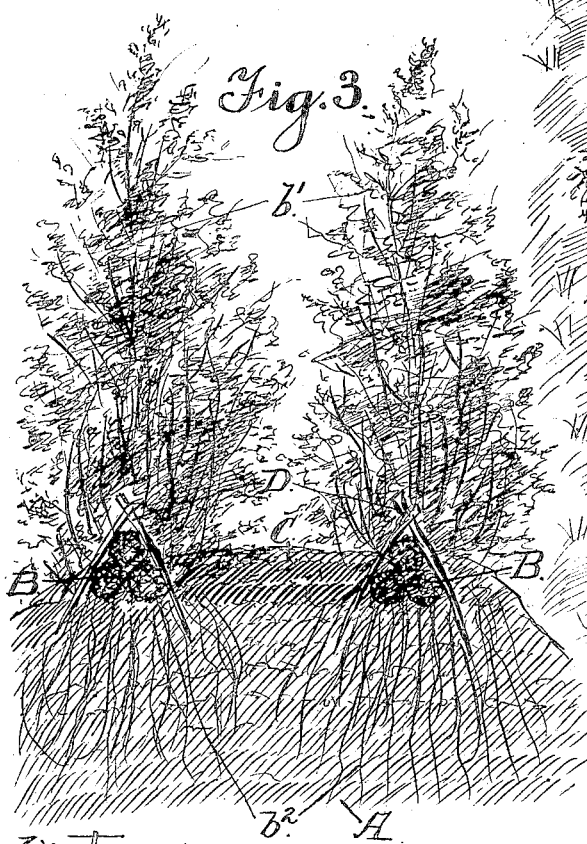
Witnesses:
Arthur L. Slee
J. Compton
Inventor.
Frank V. Wright
by Wm. F. Booth
his Attorney.

UNITED STATES PATENT OFFICE.

FRANK V. WRIGHT, OF SAN FRANCISCO, CALIFORNIA.

LEVEE.

No. 813,069.  Specification of Letters Patent.  Patented Feb. 20, 1906.

Application filed September 12, 1905. Serial No. 278,140.

*To all whom it may concern:*

Be it known that I, FRANK V. WRIGHT, a citizen of the United States, residing in the city and county of San Francisco, State of California, have invented certain new and useful Improvements in Levees; and I do hereby declare the following to be a full, clear, and exact description of the same.

My invention relates to levees.

Briefly stated, my improved levee consists of a previously-established bank having laid on its top in proximity to and parallel with each edge a barrier composed of horizontally-laid bundles of willows, together with their growing roots and branches, and a filling of earthy material laid on top of the bank between the barriers and permeating the same to form the soil for the willow growth. This levee, together with certain details of construction, I shall now proceed to fully explain by reference to the accompanying drawings, in which—

Figure 1 is a vertical section transverse of the levee, showing it in its formative condition prior to the growth of the willow barriers. Fig. 2 is a plan view showing the willow barriers laid upon the previously-established bank and before the top filling is added; and Fig. 3 is a vertical section transverse of the levee, showing it in its condition after the growth of the willow barriers.

The levee consists of the previously-established bank A, the side barriers B, and the intervening added earthy material C on top of the bank between the barriers and permeating the same. The barriers B consist of bundles of willows laid in proximity to and parallel with each edge of the bank A. In the best construction these willow barriers are formed of bundles of willow twigs tied together with wires $b$, as shown in Fig. 2, and the most approved manner of laying these bundles consists in having two bundles rest upon the ground with a third upon top of the other two, as in Fig. 1, the bundles breaking joints, as shown in Fig. 2, for the purpose of strength. In order to secure the willow bundles in place, they are held by stakes D, which best are formed of willow stocks driven down into the bank at an inclination and crossing each other above, as shown, in the ordinary manner of such stakes. The added material C, which lies between and permeates the willow barriers, is material of any suitable earthy nature capable of uniting with and forming a part of the levee and of furnishing the soil necessary for the growth of the willow bundles and stakes. In practice this material will be mud in a semiliquid condition, such as is obtained by the use of the suction-dredge.

In Fig. 1 I have shown the delivery-pipe E, which may be supposed to be the discharge from a suction-dredge in the act of delivering the semiliquid mud upon the top of the previously-established bank to fill in the space between the barriers of willow bundles and to permeate their interstices. In Fig. 2 this top earthy material is not present; but the levee is ready for it, the willow barriers being in place. In Fig. 3 the final condition of the levee is seen, wherein the willow barriers are represented as having grown, throwing upwardly the mass of branches and foliage, (represented by $b'$,) and the roots extending downwardly into the levee, (represented by $b^2$.) In this final condition of the levee it will be seen that the barriers have now become living ones, their growth intertwining and constituting a part of the levee itself, holding it together in a coherent mass. When the levee has once more to be raised, it is only necessary to cut away a portion of the top of the living growth of the barriers, leaving that portion which has become so thickly intertwined as to form a barrier of itself, then to supply a fresh quantity of top material, such as the liquid mud, to fill in the space between the living barriers and to permeate them. In due time the growth again becomes abundant and once more presents a homogeneous mass.

The operation of making the levee, while apparent from the foregoing description of its construction, may be stated as follows: The levee-bank previously established having been found too low and requiring to be raised and generally strengthened, the first step is to lay the willow bundles along the top of the bank parallel with and near to its edges and to properly secure said bundles—as, for example, by driving in the stakes—which are best formed, as previously stated, of willows. The side barriers having thus been formed, the next step is to supply the replenishing material—such, for example, as the liquid mud from the suction-dredge—said material filling in the space between the barriers and permeating them, thereby raising the levee and furnishing the soil necessary for the growth of the barriers. This completes the operation as far as human agency is concerned, the remainder being left to time, resulting in the growth of the barriers and the provision of a tangled mass of roots and branches, which will hold the levee together and will furnish for the future the necessary side barriers for a repetition of the operation as far as the filling in of supplementary mud is concerned.

Having thus described my invention, what I claim as new, and desire to secure by Letters Patent, is—

1. A levee comprising a previously-established bank, side barriers extending along the top edges of said bank and consisting of horizontally-laid willow bundles, and earthy material on the bank between said barriers and permeating their interstices.

2. A levee comprising a previously-established bank, side barriers extending along the top edges of said bank and consisting of horizontally-laid willow bundles, together with their growing roots and branches, and earthy material on the bank between said barriers and permeating their interstices.

3. A levee comprising a previously-established bank, side barriers extending along the top edges of said bank, and consisting of horizontally-laid willow bundles, willow stakes holding said bundles in position, and earthy material on the bank between said barriers and permeating their interstices.

4. A levee comprising a previously-established bank, side barriers extending along the top edges of said bank and consisting of horizontally-laid willow bundles, together with their growing roots and branches, willow stakes holding said bundles in position, and earthy material on the bank between said barriers and permeating their interstices.

In witness whereof I have hereunto set my hand.

FRANK V. WRIGHT.

Witnesses:
   J. COMPTON,
   D. B. RICHARDS.